I. & I. M. GROSS.

Carriage-Brake.

No. 59,834. Patented Nov. 20, 1866.

Witnesses: Inventor:

United States Patent Office.

IMPROVEMENT IN WAGON BRAKE.

ISAAC AND I. M. GROSS, OF NEW GALENA, PENNSYLVANIA.

Letters Patent No. 59,834, dated November 20, 1866.

SPECIFICATION.

TO ALL WHOM IT MAY CONCERN:

Be it known that we, I. GROSS and I. M. GROSS, of New Galena, Bucks county, and State of Pennsylvania, have invented a new and improved Wagon Brake; and we do hereby declare that the following is a full, clear, and exact description thereof, which will enable others skilled in the art to make and use the same, reference being had to the accompanying drawing forming part of this specification, in which—

Figure 1:
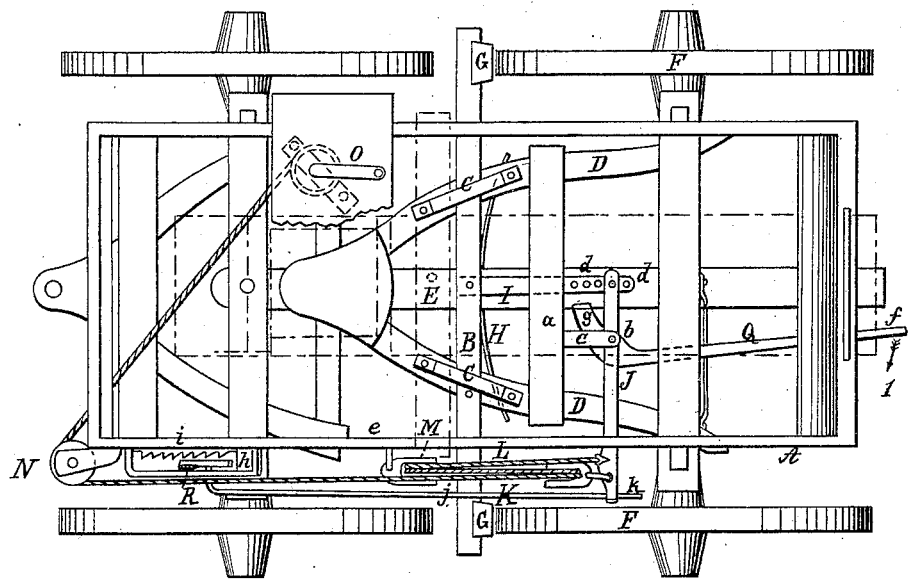

Figure 1 is a plan or top view of our invention.

Figure 2:
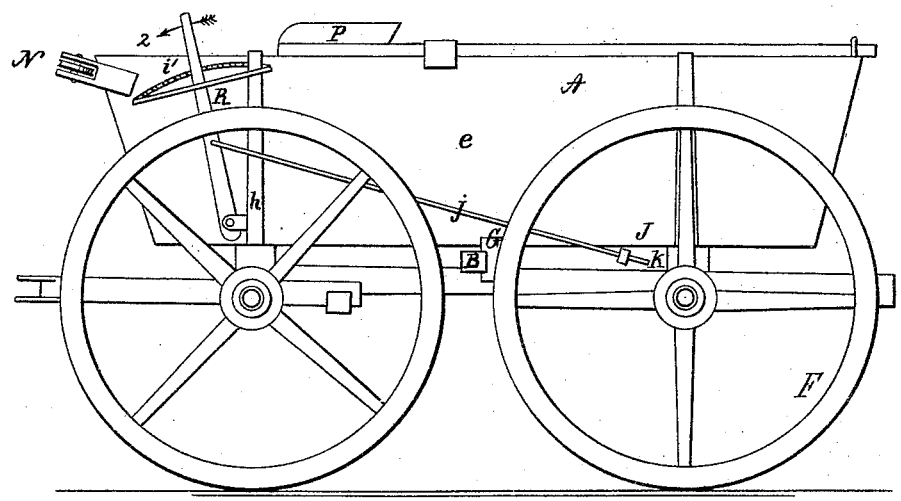

Figure 2, a side view of the same.

Similar letters of reference indicate like parts.

This invention consists in a novel application of a brake to a wagon, as hereinafter fully shown and described, whereby the brake is rendered capable of being operated in three different ways, to wit: from the driver's seat on the wagon, when the driver is riding; at the rear of the wagon, when the driver is walking behind it; or at the side of the wagon, when the driver is walking by the side of it.

A represents a wagon, which may be constructed in the usual way, and therefore does not require a special description. B represents a bar, which is fitted and works in guides, C, on the braces, D, D, of the reach, E, said bar, B, having a transverse position relatively with the reach, extending out in front of the rear wheels, F, F, of the wagon, and having a shoe, G, secured to each end of it, the shoes being in line with the rear wheels, F, F, as shown clearly in fig. 1.

This shoe bar, B, has a spring, H, attached to it, which bears near its ends against the rear ends of the guides, C, C, and has a tendency to keep the shoes, G, G, off from the peripheries of the wheels, F, F.

I is a bar which projects centrally from the rear of the shoe bar, B, and passes loosely through a cross-bar, a, attached to the braces, D, D, of the reach, E, said bar having a lever, J, connected to its rear end, the fulcrum, b, of which is in an arm, d, projecting from the cross-bar, a, as shown in fig. 1. The rear part of the bar, I, has a series of holes, d, made in it, so that the lever, J, may be connected to I at different points, and the outer end of lever, J, extends a trifle beyond one side of the body of the wagon, and has a pulley block, K, attached, through which a rope, L, passes, said rope being also attached to lever, J, and also passing through a pulley block, M, attached to one side, e, of the wagon body, and then around a pulley, N, at the front end of said side, e, and to a windlass, O, at the side of the driver's seat, P, to which windlass the rope, L, is attached. By this means it will be seen that the shoes, G, G, may be applied to the wheels, F, F, by the driver from his seat, P.

In the same arm, c, in which the lever, J, has its fulcrum pin, b, there is fitted on the same pin, b, another lever Q, the longer arm, f, of which extends beyond the rear end of the wagon body, and the shorter arm, g, projects towards the bar I. By moving the long arm, f, of this lever, Q, in the direction indicated by arrow 1 the short arm, g, will bear against the lever J, and cause the shoes, G, to bear against the wheels, F. By this means the driver may apply the brake when walking at the rear of the wagon.

R is a lever which is attached to the lower part of the front standard, h, of the wagon by the side, e, of the body, and is retained at any desired point within the scope of its movement by means of a rack, i, attached to side e. This lever, R, is connected by a rod, j, with the outer end of lever J, said rod passing loosely through the lever, and having a head, h, at its outer end, so that the outer end of the lever J may move freely on rod J, when actuated by the windlass O, or lever Q. It will be seen that if the lever, R, is moved in the direction indicated by arrow 2, the shoes, G, will be applied to the wheels F.

Thus, by this very simple arrangement, the brake may be applied by the driver either from his seat, while riding, or while walking either at the rear or side of the wagon.

Having thus described our invention, we claim as new, and desire to secure by Letters Patent—

The shoe bar B, in combination with the levers J Q, pulley blocks K M, rope L, windlass O, lever R, and rod j, all arranged and applied to a wagon, substantially in the manner as and for the purpose set forth.

ISAAC GROSS,
I. M. GROSS.

Witnesses for I. Gross:
   JOHN A. LOUX,
   S. TRAUGEE.

Witnesses for I. M. Gross:
   WM. F. MCNAMARA,
   ALEX. F. ROBERTS.